US007791700B2

(12) United States Patent
Bellamy

(10) Patent No.: US 7,791,700 B2
(45) Date of Patent: Sep. 7, 2010

(54) LIQUID CRYSTAL DISPLAY ON A PRINTED CIRCUIT BOARD

(75) Inventor: Alan Keith Bellamy, Aurora, OH (US)

(73) Assignee: Kent Displays Incorporated, Kent, OH (US)

( * ) Notice: Subject to any disclaimer, the term of this patent is extended or adjusted under 35 U.S.C. 154(b) by 1334 days.

(21) Appl. No.: 11/228,137

(22) Filed: Sep. 16, 2005

(65) Prior Publication Data

US 2007/0063939 A1 Mar. 22, 2007

(51) Int. Cl.
*G02F 1/133* (2006.01)

(52) U.S. Cl. ...................................... 349/149; 349/158

(58) Field of Classification Search ....................... None
See application file for complete search history.

(56) References Cited

U.S. PATENT DOCUMENTS 3,600,060 A 8/1971 Churchill
3,680,950 A 8/1972 Haas et al.
4,204,205 A * 5/1980 Yagi et al. .................... 349/149
4,362,903 A 12/1982 Eichelberger et al.
4,510,188 A 4/1985 Ruggeri
4,549,174 A * 10/1985 Funada et al. ............... 349/150
4,642,250 A 2/1987 Spector
4,684,771 A 8/1987 Wuthrich (Continued)

FOREIGN PATENT DOCUMENTS

WO 92/11311 7/1992

(Continued)

OTHER PUBLICATIONS

*Reflective display with photoconductive layer and a bistable reflective cholesteric mixture*, Hidefumi Yoshida et al., Journal SID 5/3, 1997, pp. 269-274.

(Continued)

*Primary Examiner*—Mike Stahl
(74) *Attorney, Agent, or Firm*—Pearne & Gordon LLP

(57) ABSTRACT

The present invention features a liquid crystal display device including a printed circuit board, PCB, substrate composed of non-conductive material and having a front surface and having an opposing back surface that contains electrical circuitry and is located near the back of the display device. A liquid crystal display is disposed on the front PCB substrate surface and includes first and second electrode layers and a dispersion layer disposed between the first and second electrode layers. The dispersion layer includes liquid crystal (e.g., cholesteric liquid crystal) dispersed in a polymer matrix. Electrical through-conductors extend between the front substrate surface and the back substrate surface. The through-conductors are in electrical contact with the first and second electrode layers. Drive electronics are disposed on the PCB substrate and are adapted to apply voltage pulses to the first and second electrodes effective to form images on the liquid crystal display. In one aspect the front of the PCB substrate is a non-component surface free of drive electronics. In another aspect, the PCB substrate is the only substrate of the display device. Also featured are methods of making the display device, including forming the display as a transfer film, which forms an electrical connection when the first electrode layer is applied to the PCB substrate. Another method forms the device by printing or coating the display component layers on the PCB substrate.

26 Claims, 8 Drawing Sheets

U.S. PATENT DOCUMENTS

| | | | |
|---|---|---|---|
| 4,688,900 A | 8/1987 | Doane et al. | |
| 4,747,413 A | 5/1988 | Bloch | |
| 4,890,902 A | 1/1990 | Doane et al. | |
| 4,896,946 A | 1/1990 | Suzuki et al. | |
| 4,948,232 A | 8/1990 | Lange | |
| 5,007,872 A | 4/1991 | Tang | |
| 5,061,553 A | 10/1991 | Olsen, Jr. | |
| 5,161,479 A | 11/1992 | Mahr | |
| 5,172,108 A | 12/1992 | Wakabayashi et al. | |
| 5,200,845 A | 4/1993 | Crooker et al. | |
| 5,360,503 A | 11/1994 | Coffy | |
| 5,376,699 A | 12/1994 | Sage | |
| 5,401,437 A * | 3/1995 | Im | 252/299.01 |
| 5,437,811 A | 8/1995 | Doane et al. | |
| 5,453,863 A | 9/1995 | West et al. | |
| 5,493,430 A | 2/1996 | Lu et al. | |
| 5,510,915 A * | 4/1996 | Ge et al. | 349/42 |
| 5,530,457 A | 6/1996 | Helgeson | |
| 5,625,477 A | 4/1997 | Wu et al. | |
| 5,636,044 A | 6/1997 | Yuan et al. | |
| 5,644,330 A | 7/1997 | Catchpole et al. | |
| 5,668,614 A | 9/1997 | Chien et al. | |
| 5,691,795 A | 11/1997 | Doane et al. | |
| 5,734,155 A | 3/1998 | Rostoker | |
| 5,748,277 A | 5/1998 | Huang et al. | |
| 5,751,257 A | 5/1998 | Sutherland | |
| 5,815,136 A | 9/1998 | Ikeda et al. | |
| 5,847,798 A | 12/1998 | Yang et al. | |
| 5,889,572 A | 3/1999 | Takahashi et al. | |
| 5,981,408 A | 11/1999 | Nakagawa et al. | |
| 5,996,897 A | 12/1999 | Prancz | |
| 6,034,752 A | 3/2000 | Khan et al. | |
| 6,061,107 A | 5/2000 | Yang et al. | |
| 6,072,619 A | 6/2000 | Kiryuschev et al. | |
| 6,096,666 A | 8/2000 | Jachimowicz et al. | |
| 6,133,895 A | 10/2000 | Huang | |
| 6,224,964 B1 | 5/2001 | Kawai et al. | |
| 6,253,190 B1 | 6/2001 | Sutherland | |
| 6,268,839 B1 | 7/2001 | Yang et al. | |
| 6,268,841 B1 | 7/2001 | Cairns et al. | |
| 6,269,342 B1 | 7/2001 | Brick et al. | |
| 6,270,783 B1 | 8/2001 | Slavtcheff et al. | |
| 6,271,898 B1 | 8/2001 | Clikeman et al. | |
| 6,277,439 B1 | 8/2001 | Painter | |
| 6,278,429 B1 | 8/2001 | Ruth et al. | |
| 6,307,605 B1 | 10/2001 | Bailey | |
| 6,316,278 B1 | 11/2001 | Jacobsen et al. | |
| 6,320,563 B1 | 11/2001 | Yang et al. | |
| 6,359,673 B1 | 3/2002 | Stephenson | |
| 6,377,321 B1 | 4/2002 | Khan et al. | |
| 6,423,368 B1 | 7/2002 | Stephenson et al. | |
| 6,433,849 B1 | 8/2002 | Lowe | |
| 6,452,590 B1 | 9/2002 | Awamoto et al. | |
| 6,459,467 B1 | 10/2002 | Hashimoto et al. | |
| 6,468,638 B2 | 10/2002 | Jacobsen et al. | |
| 6,483,563 B2 | 11/2002 | Khan et al. | |
| 6,532,052 B1 | 3/2003 | Khan et al. | |
| 6,556,262 B1 | 4/2003 | Stephenson et al. | |
| 6,585,849 B2 | 7/2003 | Smith et al. | |
| 6,603,259 B1 | 8/2003 | Kiryuschev et al. | |
| 6,608,438 B2 | 8/2003 | Topelberg et al. | |
| 6,618,114 B1 | 9/2003 | Freeman | |
| 6,624,565 B2 | 9/2003 | Topelberg | |
| 6,628,256 B2 | 9/2003 | Nishimura | |
| 6,654,080 B1 | 11/2003 | Khan et al. | |
| 6,655,788 B1 | 12/2003 | Freeman | |
| 6,657,620 B2 | 12/2003 | Oishi et al. | |
| 6,667,791 B2 * | 12/2003 | Sanford et al. | 349/139 |
| 6,697,191 B2 | 2/2004 | Kiryuschev et al. | |
| 6,710,760 B1 | 3/2004 | Johnson et al. | |
| 6,727,197 B1 | 4/2004 | Wilson et al. | |
| 6,788,362 B2 | 9/2004 | Stephenson et al. | |
| 6,819,310 B2 | 11/2004 | Huang et al. | |
| 6,850,217 B2 | 2/2005 | Huang et al. | |
| 6,864,435 B2 | 3/2005 | Hermanns et al. | |
| 6,902,454 B1 | 6/2005 | Petruchik | |
| 7,009,666 B2 | 3/2006 | Khan et al. | |
| 7,177,064 B2 * | 2/2007 | Park | 359/270 |
| 2001/0015712 A1 | 8/2001 | Hashimoto | |
| 2002/0030776 A1 | 3/2002 | Khan et al. | |
| 2002/0186182 A1 | 12/2002 | Stephenson et al. | |
| 2003/0011549 A1 | 1/2003 | Murahashi et al. | |
| 2003/0016329 A1 | 1/2003 | Smith et al. | |
| 2003/0019575 A1 | 1/2003 | Smith et al. | |
| 2003/0031845 A1 | 2/2003 | Umeya et al. | |
| 2003/0034945 A1 | 2/2003 | Mi et al. | |
| 2003/0063245 A1 | 4/2003 | Bowley et al. | |
| 2003/0071791 A1 | 4/2003 | Hanson et al. | |
| 2003/0085380 A1 | 5/2003 | Schuhmacher et al. | |
| 2003/0117548 A1 | 6/2003 | Stephenson | |
| 2003/0160912 A1 | 8/2003 | Stephenson | |
| 2003/0169221 A1 | 9/2003 | Stephenson et al. | |
| 2003/0184569 A1 | 10/2003 | Koga et al. | |
| 2003/0202136 A1 | 10/2003 | Stephenson et al. | |
| 2003/0206147 A1 | 11/2003 | Mi et al. | |
| 2003/0222139 A1 | 12/2003 | Stephenson et al. | |
| 2004/0032545 A1 | 2/2004 | Stephenson et al. | |
| 2004/0080477 A1 | 4/2004 | Capurso et al. | |
| 2005/0007336 A1 | 1/2005 | Albert et al. | |
| 2005/0083284 A1 | 4/2005 | Huang et al. | |

FOREIGN PATENT DOCUMENTS

| | | |
|---|---|---|
| WO | 2005/072455 | 8/2005 |
| WO | 2005/081779 | 9/2005 |

OTHER PUBLICATIONS

*Photostable tilted-perpendicular alignment of liquid crystals for light valves*, Anna Lackner et al., Proceedings of the SID, vol. 31/4, 1990, pp. 321-326.

*Transparent phase images in photoactivated liquid crystals*, J.S. Margerum et al., Applied Physics Letter, vol. 19, No. 7, Oct. 1, 1971, pp. 216-218.

*Development of a flexible electronic display using photographic technology*, Stanley Stephenson et al., SID 04 Digest, pp. 774-777, (2004).

*A fully flexible colour display*, Peter Slikkerveer et al., SID 04 Digest, pp. 770-773, (2004).

*Invited paper: What is electronic paper? The expectations*, Makoto Omodani, SID 04 Digest, pp. 128-131, (2004).

*Effect of woven fabric anisotropy on drape behaviour*, Sidabraite et al., ISSN 1392-1320, Materials Science, vol. 9, No. 1, 2003, pp. 111-115.

*The characterization of the static and dynamic drape of fabrics*, G.K. Stylios et al., J. Text. Inst., 1997, 88 Part 1, No. 4, pp. 465-475.

*Modelling the fused panel for a numerical simulation of drape*, Jevsnik et al., Fibers & Textiles in Eastern Europe, Jan./Mar. 2004, vol. 12, No. 1, 0047-52.

*Mechanics of elastic performance of textile materials*, Chauncey Chu et al., Textile Research Journal, Aug. 1950, pp. 539-548.

*The dependence of fabric drape on bending and shear stiffness*, G.E. Cusick, J. Textile Institute 36, 11, 1965, pp. T597-T-607.

*Liquid crystal dispersions*, Paul S. Drzaic, World Scientific, Series on Liquid Crystals, vol. 1, pp. xi-xv, 1995.

*Plastic VGA reflective cholesteric LCDs with dynamic drive*, G.M. Podojil et al., SID proceedings, 1998, pp. 51-54.

*Reflective color display using cholesteric crystals*, K. Hashimoto et al., SID 98 Digest, pp. 897-900, (1998).

*Black and white photo-addressable electronic paper using encapsulated cholester liquid crystal and organic photoconductor*, T. Kakinuma et al., IDW 2002, pp. 1345-1348.

*Characterization of "Peas in a Pod", a novel idea for electronic paper*, S. Maeda et al., IDW 2002, pp. 1353-1356.

*Holographic polymer-dispersed liquid crystals* (*H-PDLCs*), T.J. Bunning et al., Annu. Rev. Mater. Sci 2000, 30:83-115, pp. 83-115.
*Reflective multicolor display using cholesteric liquid crystals*, M. Okada et al., Proc, SID 97 Digest, pp. 1019-1022, (1997).
*Multiple color high resolution reflective cholesteric liquid crystal display*, D. Davis et al., Proc IDRC (242) 1997.
*Full color* (*4096 Colors*) *reflective cholesteric crystal display*, X. Huang et al., Proceedings of Asia Display 98, pp. 883-886 (1998).
Jing-Jou Tang et al., *A 30-V Row/Column Driver for PSCT LCD Using High-Voltage BiMOS Process*, Online Article, dated 1999.
http://www/us.semiconductors.philips.com/pip/PCF8578.html, LCD/row/column driver for dot matrix graphic displays, printed Jul. 8, 2003, pp. 1-3.
40CH Segment/Driver for Dot Matrix LCD, KS0065B, Samsung Electronics, 12 pages.
Vogels, Joost P. A., Klink, Stephen I., Penterman, Roel, de Koning, Henk, Huitema, Edzer E. A., Broer, Dirk J. , "*16.1: Robust Flexible LCDs with Paintable Technology*," SID 04 Digest, pp. 767-769, (2004).
Doane, J. William, Khan, Asad; Cholesteric Liquid Crystals for Flexible Displays, in *Flexible Flat Panel Displays*, Ed. G. Crawford) John Wiley & Sons, England, Chapter 17 (2005) pp. 331-354.
Doane, J. William, "Polymer Dispersed Liquid Crystal Displays", in *Liquid Crytals: Applications & Uses*, Ed. Birendra Bahadur (World Scientific Pub. 1990), Chapter 14, pp. 361-395.
Luo, F.C., "Active Matrix LC Displays", in *Liquid Crystals: Applications & Uses*, (ed. B. Bahaur), World Scientific, Singapore, Chapter 15, pp. 397-436.

* cited by examiner

LIQUID CRYSTAL DISPLAY ON A PRINTED CIRCUIT BOARD

I. FIELD OF THE INVENTION

The present invention is directed to the field of liquid crystal displays and, in particular, to flexible liquid crystal displays.

II. BACKGROUND OF THE INVENTION

Flat panel displays as they appear in the marketplace today are generally all constructed on glass substrates. Liquid crystal displays (LCDs) that hold the greatest market share are fabricated using two glass substrates with liquid crystalline material sandwiched in between. In recent years there has been considerable interest in fabricating LCDs as well as other technologies on substrates that are flexible such as plastic or even drapable such as fabric. Such substrates are not so easily broken, are lighter in weight, and can be flexed, bent or made conformable to specific shapes and hold potential for lower cost roll-to-roll or sheet-to-sheet manufacturing.

In most of the LCD examples above, the bulk of the drive and control electronic circuitry is on a printed circuit board (PCB) that is typically separate from the glass display cell but mechanically attached via a bezel and some type of flexible cable, conductive elastomer, or metal pins to make electrical connections. Interconnects between the drive electronics and the display cell are one of the most labor intensive, intricate, fragile and problematic components of a flat panel display and its manufacturing. Some reduction in the number of interconnects is made with chip on glass type construction where the drive chips, for example, may be physically attached to the glass substrates.

More recently, efforts to construct displays on flexible substrates such as plastic have made the interconnect issue more problematic than ever in that interconnects must also be flexible if the same construction designs are employed that were used on glass displays. This has prompted other types of interconnect and display cell designs.

Contact strips on the flexible display have been disclosed as an interconnect means. U.S. Pat. No. 5,751,257 discloses a two-substrate flexible cell design for a shelf tag with a contact strip connected to the display electrodes. External electronic drive electronics are connected to the display through the contact strip. In a similar fashion, a contact strip is used in U.S. Pat. No. 4,948,232 to connect a large format two-substrate flexible display to an external drive apparatus. U.S. Pat. No. 4,896,946 discloses a two-substrate flexible display connected to a circuit board via a conductive adhesive contact strip.

U.S. Pat. No. 6,864,435 discloses a display design for a flexible smart card where conductors on the back surface of the display substrate are connected to integrated driver and other circuits as well as the column electrodes on the top side of the substrate using holes filled with a conductive material. The holes are laser drilled through the substrate to the electrodes and conductive material on the back of the substrate. The electrodes on the back side of the substrate can be patterned before or after the holes are made and used to make connections to the smart card contact pins. Drive circuits are deposited on the top side of the flexible substrate through a fluidic self-assembly process or other processes as may be used for organic light emitting diodes ("OLEDs") or polymer light emitting diodes ("PLEDs") or certain types of liquid crystal displays utilizing two substrates. In the case of the liquid crystal displays, row electrodes are on a separate cover substrate and are connected to the row drivers through conventional techniques for forming interconnects between the cover and bottom substrate.

Published patent application, U.S. Patent Application Publication No. 2003/0202136, discloses a cholesteric liquid crystal display fabricated on a single flexible substrate; however, the substrate is transparent. Since the display is viewed through the transparent substrate, the conducting elements of the display are applied to the back side of the transparent substrate. A support is located at the back of the display and makes electrical contacts so that the display is addressable from the front.

In this invention disclosed is a means of interconnecting to a single substrate; but, the substrate is the circuit board itself, containing drive and control electronics. In this case the substrate does not have to be transparent. The display elements are coated, printed or laminated on the circuit board substrate with the display electrodes connected to conductive pads on the substrate that are electrically connected to circuitry on the back of the circuit board.

III. DISCLOSURE OF THE INVENTION

In this invention, disclosed is a new concept in display technology: a display that is coated or printed in layers directly onto a printed circuit board (PCB). This display is a stacked sequence of coated or printed layers that form a film with components of a reflective display such as the liquid crystal material, transparent conducting electrodes, insulation layers to prevent electrical shorts, and protective layers, all stacked together in a veneered film forming all the elements of a display. The layers are each cast in sequence and transferred or directly formed on the PCB containing the driving electronics. Rugged connections to the display are made automatically as the conducting layers of the display cell (i.e., the electrodes) are applied to exposed contacts or vias on the PCB.

The advantages of the invention are: simplified LCD manufacturing processes vs. currently produced displays; lower cost; a much more rugged display; and the ability to create borderless display panels which can be tiled together into a large format display matrix. Fragile interconnection cables/tabs are eliminated from the display and existing manufacturing technologies are employed; printing, screening, coating.

Cholesteric materials are particularly well suited for coated or printed display processes in that they can be encapsulated as droplet dispersions that can be coated or printed and are self-sealing to contain the cholesteric liquid crystal in the film. Furthermore, cholesteric materials are field driven requiring near negligible current to change their optical state. As such, the conducting electrodes can be materials as conducting polymers or carbon nanotubes that can be printed or coated into a film. Cholesteric displays are reflective and include cholesteric liquid crystal. The cholesteric display includes focal conic and planar textures that are stable in an absence of an electric field.

A substrate as defined herein is a structure that supports components of a liquid crystal display including a liquid crystal layer that is electrically addressed to produce images. The substrate need not be rigid but can be flexible or drapable as disclosed in U.S. application Ser. No. 11/006,100, filed Dec. 7, 2004, which is incorporated herein by reference in its entirety. Glass, metal, polymer, paper and fabric or textile can all be used as substrate materials. The substrate is a generally thin layer, but is often significantly thicker than other components of the display. As defined herein and consistent with U.S. Pat. No. 6,788,362 owned by Kodak, a substrate is a layer that has a thickness of at least 20 microns and, in particular, at least 50 microns. Substrates of liquid crystal displays on the market today can have a thickness of 100 microns or more and substrates such as fabrics can be substantially thicker exceeding 1000 microns. The substrate can be formed of or have various components attached to it such as electrodes, an active matrix backplane, solar cell, photovoltaic device and the like. The present invention is usable in connection with displays employing one, two, or more substrates. The term PCB substrate used herein means a PCB that functions as a substrate.

Many additional features, advantages and a fuller understanding of the invention will be had from the accompanying drawings and the detailed description that follows. It should be understood that the above Disclosure of the Invention describes the invention in broad terms while the following Detailed Description describes the invention more narrowly and presents preferred embodiments that should not be construed as necessary limitations of the broad invention as defined in the claims.

IV. BRIEF DESCRIPTION OF THE DRAWINGS

Figure 7:
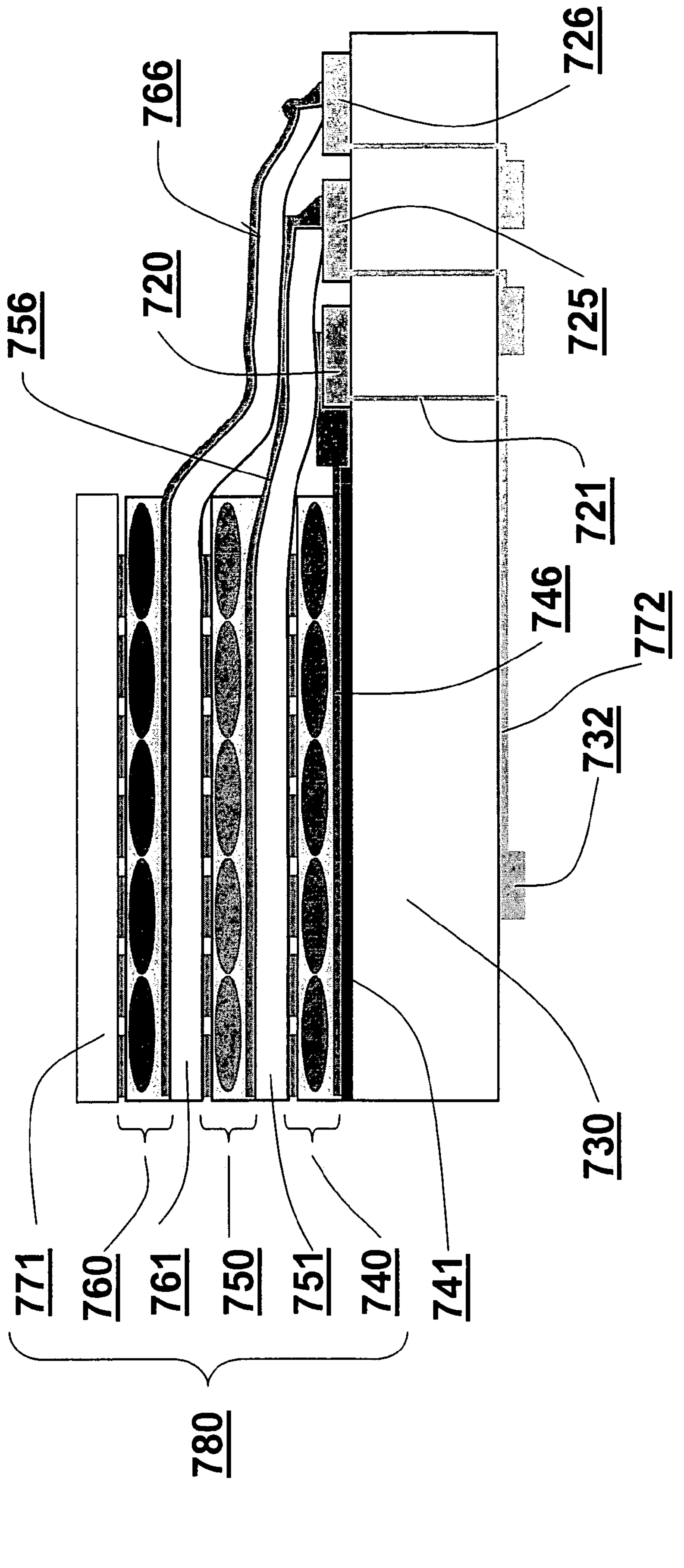
Figure 8:
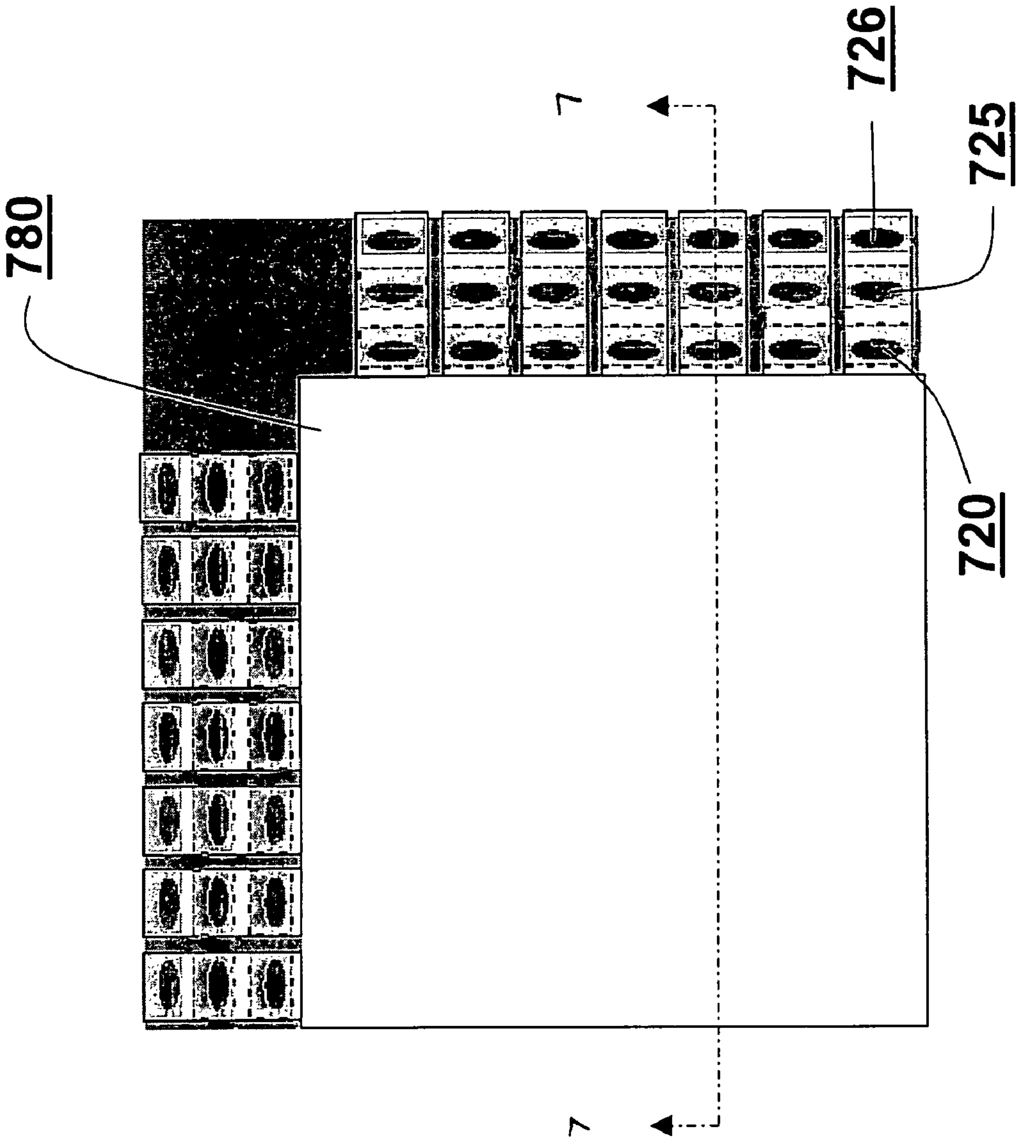

FIG. 7 is an illustration of a side view of a multiple color cholesteric reflective display as seen along cutting plane 7-7 of FIG. 8, with the display layers of the primary colors red, green and blue coated or laminated on the circuit board substrate; and FIG. 8 is an illustration of the top surface of a circuit board substrate for a multiple color cholesteric reflective display with connecting tabs for the red, green and blue stacked reflective display layers.

V. DETAILED DESCRIPTION

Disclosed is a layered display film, in particular a reflective bistable cholesteric display film, applied to the front side of a printed circuit board. One particular aspect of the invention has no drive electronics on the front of the PCB substrate, which is referred to herein as a non-component surface. The other ("back") side of the PCB contains display components and circuitry and may include the drive electronics. It will be appreciated that terms such as "front" and "back" used herein are relative terms intended to assist in understanding the invention and should not be used to limit the invention. The display is manufactured by a sequence of coated or printed materials applied to a PCB substrate with exposed contact points (vias) that are electrically connected to the conductive elements of the display as they are printed, coated, laminated, or otherwise formed and transferred, onto the PCB substrate.

Figure 1:
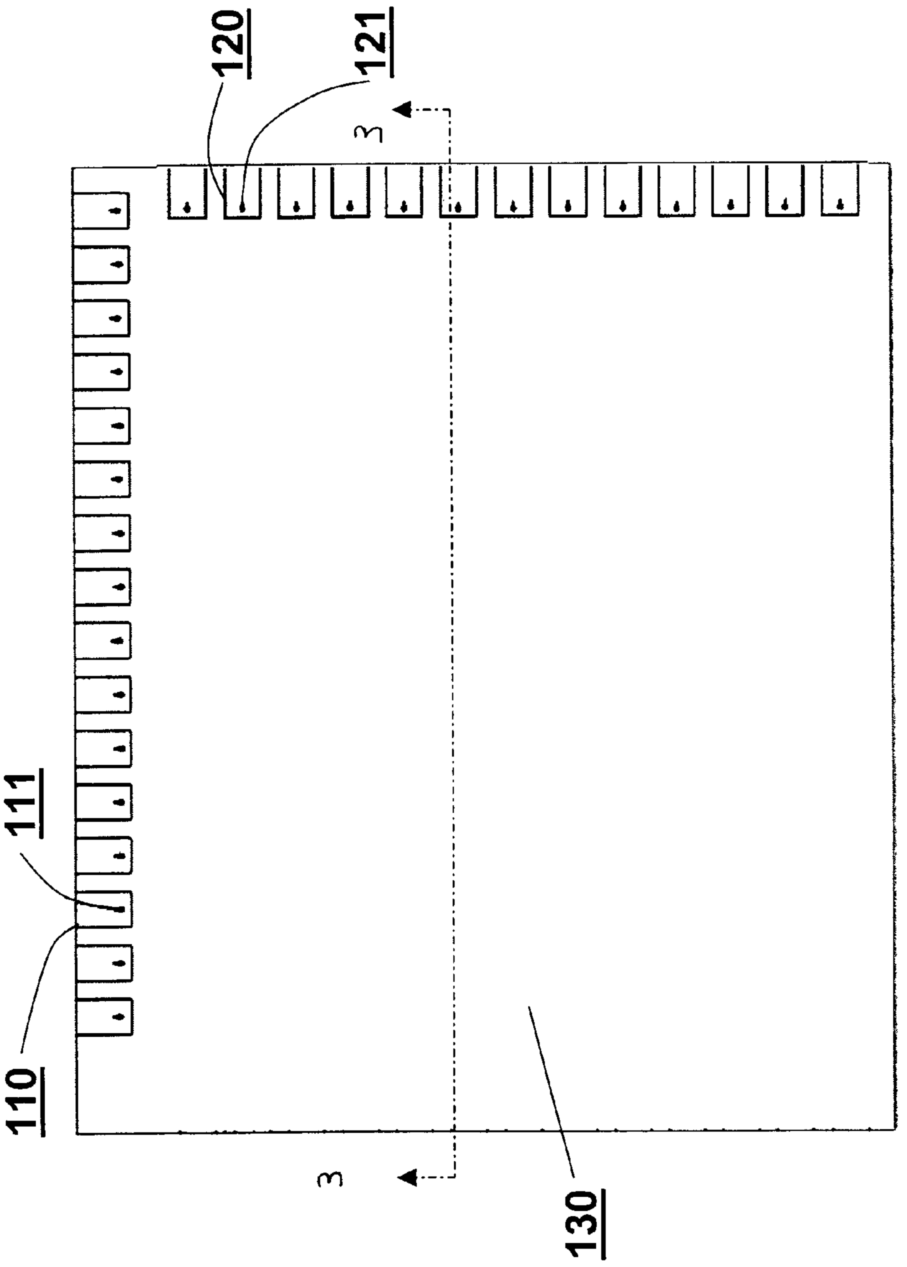
FIG. 1 is an illustration of the top surface of a circuit board substrate for an exemplary passive matrix cholesteric reflective display with connecting tabs for the column and row electrodes.

FIG. 1 is an illustration of printed circuit board substrate 100 for an exemplary passive matrix cholesteric reflective display showing the top surface 130 of the PCB substrate on which the elements of the cholesteric display are subsequently applied. The substrate can be made of plastic or other material, flexible or inflexible. Conducting pads or tabs, 110 and 120, made of metal, conducting polymer or semi-conducting material are fixed to the substrate whereby the tabs 110 are positioned on one edge of the PCB substrate arranged for subsequent connections to the upper conducting electrodes (columns) of the reflective cholesteric display and the tabs 120 are positioned on another edge of the PCB substrate for subsequent connection to lower conducting electrodes (rows) of the exemplary passive matrix display. Tabs 110 and 120 are connected to vias or conducting pins 111 and 121, respectively, which pass through the circuit board to the bottom side for connecting with electronic driving circuitry for the display. Conducting tabs 110 and 120 serve as the electrical connectors for columns and rows, respectively, for the exemplary passive matrix display such as described in U.S. Pat. Nos. 5,644,330 and 5,625,477, which are incorporated herein by reference in their entireties.

Figure 2:
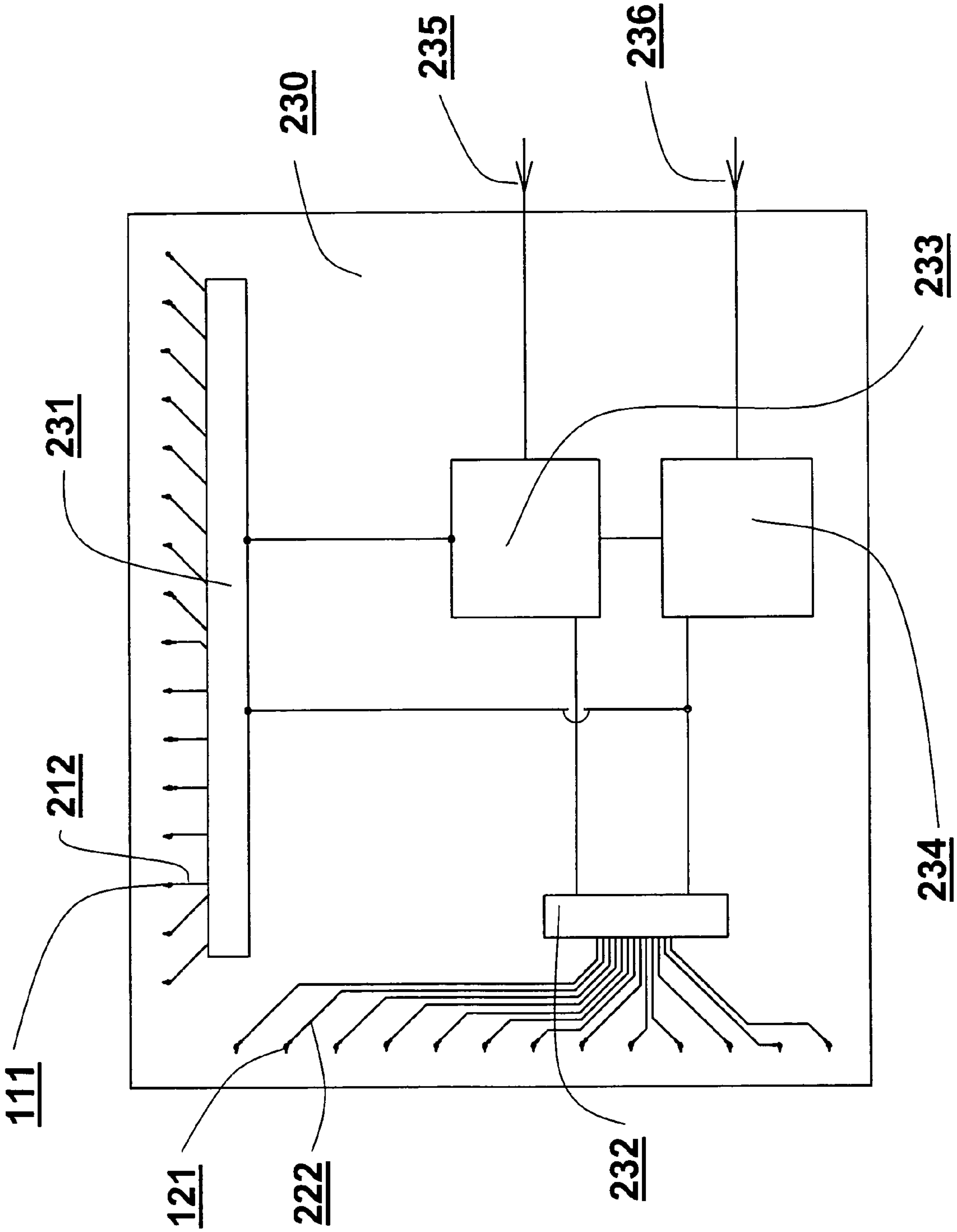
FIG. 2 is an illustration of the bottom surface of the circuit board substrate containing drive and control electronics.

FIG. 2 shows the back or circuit component side 230 of the PCB substrate. Vias 111 and 121 connect circuitry components on the back substrate surface to the display electrodes on the non-component surface of the substrate. Conductors 212 and 222 connect the vias to the drive circuitry 231 and 232, respectively. Drive circuitry 231 (e.g., column driver) provides column voltages for electronically driving the column electrodes of the exemplary passive matrix display while drive circuitry 232 (e.g., row driver) provides the row voltages for electronically driving the row electrodes of the exemplary passive matrix display such as disclosed in the U.S. Pat. Nos. 5,644,330 and 5,625,477 patents for a conventional type driving scheme for a bistable cholesteric display. The liquid crystal display device of the present invention may employ multi-configuration drive electronics and other components as disclosed in U.S. patent application Ser. No. 10/782,461, entitled "Multi-Configuration Display Driver," filed Feb. 19, 2004, which is incorporated herein by reference in its entirety. Other types of driving voltage schemes can be applied to the rows and columns such as the dynamic drive scheme (U.S. Pat. No. 5,748,277) or the cumulative drive scheme (U.S. Pat. No. 6,133,895), which are incorporated herein by reference in their entireties. Controller circuitry 233 provides the voltage signals to the column driver 231 and row driver 232. Data to be imaged on the display is fed to the controller at port 235. Power is supplied to the display at port 236 and is distributed to the various components of the display by the voltage distributor 234. It will be appreciated by those skilled in the art that the drawings are schematic and that many electrical elements, circuits and components may be added or substituted with respect to the circuitry shown in the drawings.

Figure 3:
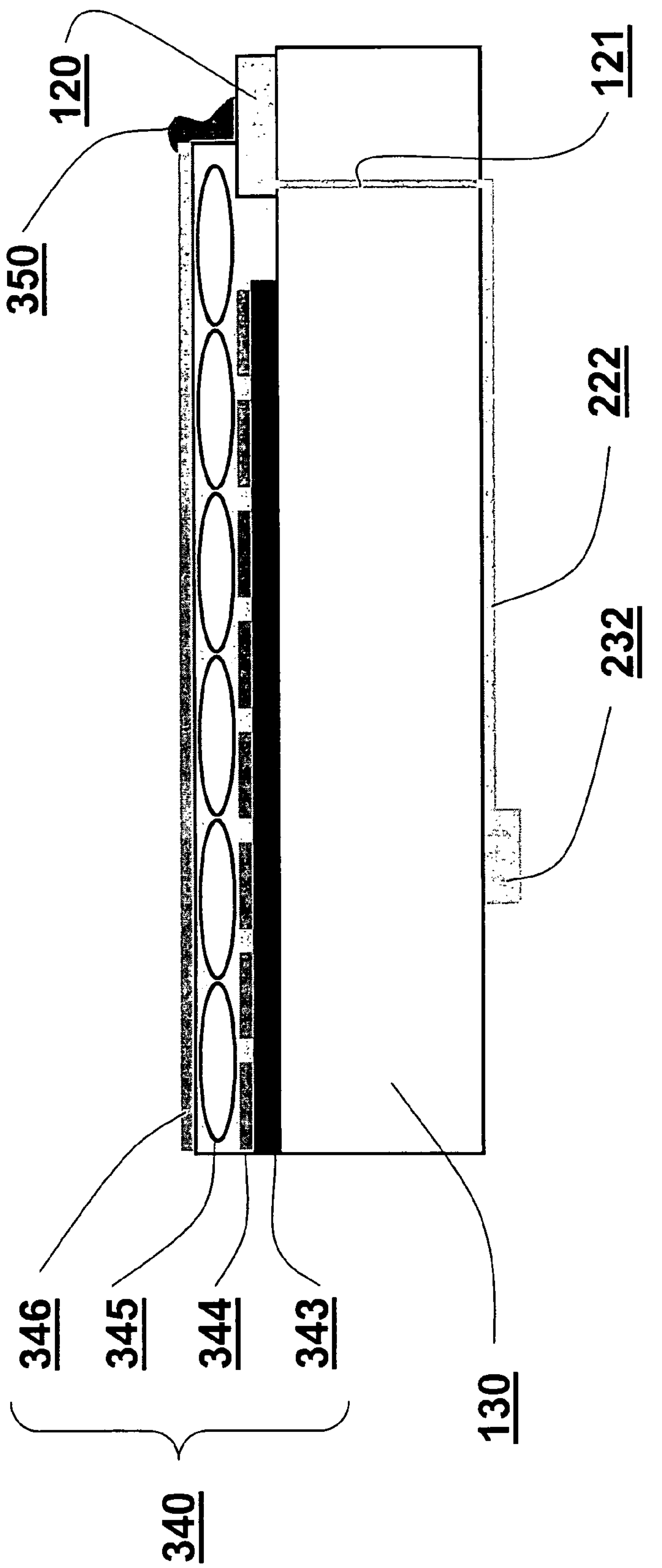
FIG. 3 is an illustration of the side view of a cholesteric reflective display as seen along cutting plane 3-3 of FIG. 1, with the display elements of the passive matrix display coated on the circuit board substrate.

Referring to FIG. 3, the elements 340 of the reflective cholesteric display are sequentially layered on the printed circuit board 130 containing the conducting pads 120, conducting vias 121, conductors 222 and driving circuits 232. The display elements 340 for the exemplary passive matrix display include a sequence of layers starting with an optional light absorbing preparation layer 343 coated on the circuit board substrate to prepare the substrate for subsequent coatings of the display elements. The preparation layer 343 serves to planarize the substrate surface and make the substrate surface smooth and chemically suitable for printing or coating the next layer. Layer 343 may involve multiple coatings or laminations and it is preferable that it be black in color. However, depending on the desired colors of the display, layer 343 may be blue or other color and generally serve to absorb selected wavelengths of light not desired to be reflected. Conducting electrode layer 344 is printed or coated above the light absorbing preparation layer 343. The electrodes and other layers of the display are printed or coated by screen printing, inkjet printing, doctor blade coating, off-set printing or other printing technologies known to the art, and suitably patterned. The electrodes may be composed of conductive polymer or carbon nanotubes. In the exemplary passive matrix cholesteric reflective display device 300, the electrode layer 344 comprises parallel conductive strips of electrodes that make up the columns of the matrix. In some cases it may be desirable to provide an insulation layer (not shown) over electrodes 344, such as by printing or coating, to avoid electrical shorts between electrodes 344 and 346.

A cholesteric droplet dispersion layer 345 is then printed or coated above the column electrode layer 344. The liquid crystal in the dispersion layer 345 is preferably a bistable cholesteric material achieved with cholesteric liquid crystalline materials having a positive dielectric anisotropy as described in U.S. Pat. Nos. 5,437,811 and 5,453,863, which are incorporated herein by reference in their entireties. As described in those patents, such materials can be electronically multiplexed allowing for a high resolution display on a simple, low-cost passive matrix. Because the display is bistable, power is only required to change the image. Once the image is addressed on the display, it remains there without any applied power. As a result, this display technology is very power efficient.

Other types of cholesteric materials can be used for the dispersion layer 345 in this remote display device. Cholesteric materials of negative dielectric anisotropy, such as disclosed in U.S. Pat. No. 3,680,950 or U.S. Pat. No. 5,200,845, which are incorporated herein by reference in their entireties, may be used. Although negative-type cholesteric materials can operate in a bistable mode, they require further development for high resolution displays. Materials that switch between a negative and positive dielectric anisotropy are disclosed for display operation in U.S. Pat. No. 6,320,563. Cholesteric materials may also be operated between a stable state and non-stable state but not as power efficiently because the display image needs to be periodically refreshed in such a display.

The cholesteric material in dispersion layer 345 is preferably in the form of a droplet dispersion encapsulated in a polymer so that it may be coated or printed over the substrate as described, for example, in the published book, J. W. Doane and A. Khan, *Flexible Flat Panel Displays* (Ed. G. Crawford) John Wiley and Sons, England, Chapter 17 (2005). The droplet dispersions may be prepared by phase separation processes or emulsion processes such as described in U.S. patent application Ser. Nos. 11/046,487 and 11/006,100, which are incorporated herein by reference in their entireties. In phase separation processes the droplets are created after the material is coated on the substrate by ultraviolet radiation whereas in the emulsion process the droplets are created before coating. In the case of emulsions the material is coated and dried to form the layer.

The next layer in the bottom-up sequence of layers is the transparent conducting electrode layer 346 which in the case of the exemplary passive matrix display, comprises parallel conductive strips of electrodes that make up the rows of the matrix. The row electrodes 346 are electrically connected to a corresponding conducting pad by a conductive liquid. For example, one of the electrode rows is electrically connected to conducting pad 120 by a conductive connector 350. Connector 350 may be a conducting paste, conductive polymer or a pressure-sensitive adhesive that is conductive in one direction so as to make an electrical contact between each row and its respective conducting tab 120. As illustrated in FIG. 3, the tab 120 is electrically connected to circuitry 232 on the other side of the board by a via or conducting pin 121. In the case of the exemplary passive matrix display the conductor 222 electrically connects the via 121 to the drive circuitry 232.

Figure 4:
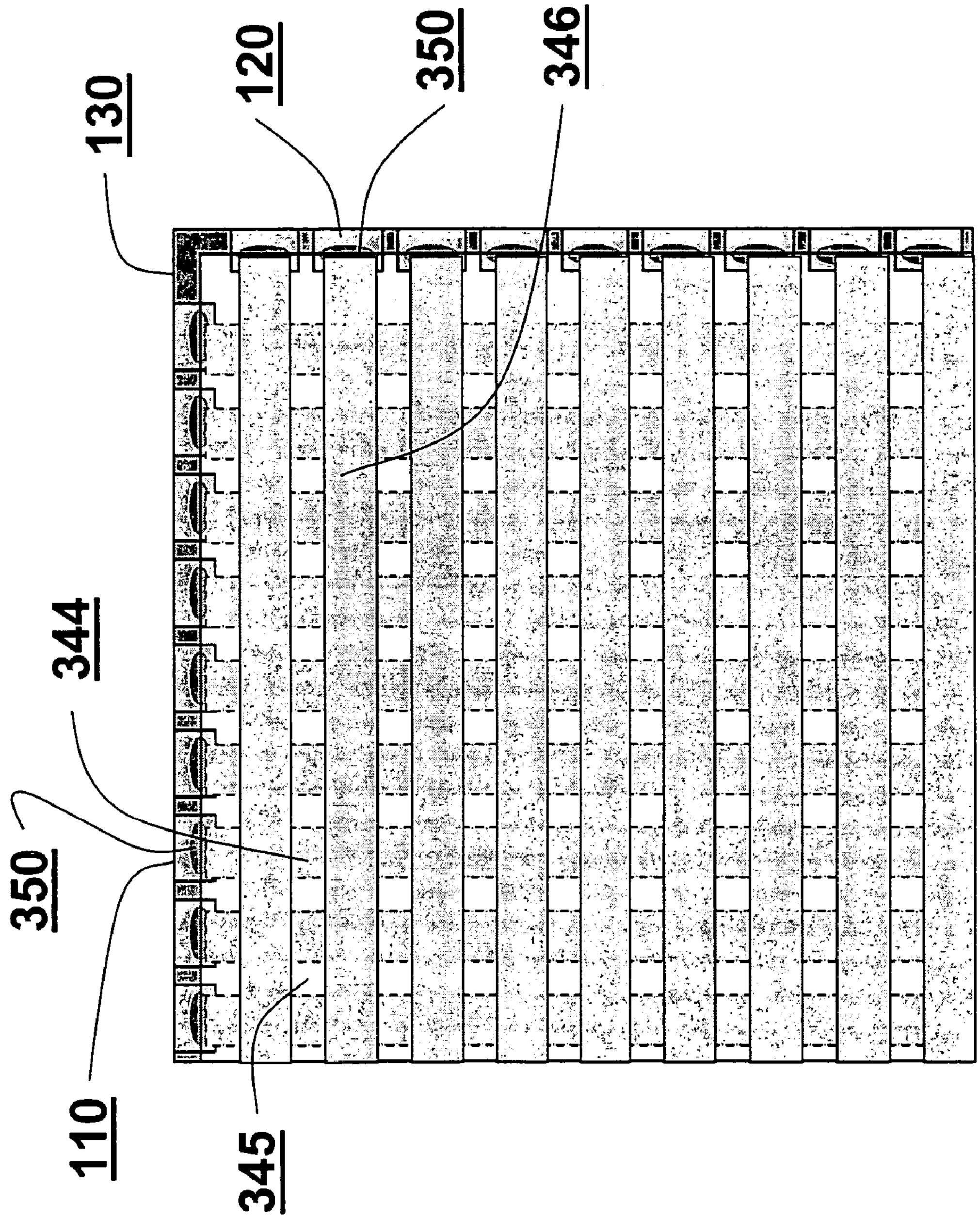
FIG. 4 is an illustration of the top view of the cholesteric reflective display with the display elements of the passive matrix display coated on the circuit board substrate.

FIG. 4 illustrates a top view of the column and row electrodes 344 and 346. Conducting tabs 110 and 120 are electrically connected to the column and row electrodes, respectively, using conductive paste 350. For example, the conductive paste 350 is shown electrically connecting a row electrode 346 and the pad 120. The conductive paste 350 is also shown electrically connecting a column electrode 344 and a column tab 110. The printed or coated cholesteric droplet dispersion layer 345 is located between the column and row conducting layers. An optically clear protective layer is printed, coated or laminated as an outer surface of the display device over the row electrodes 346 (not shown in FIG. 4).

Figure 5:
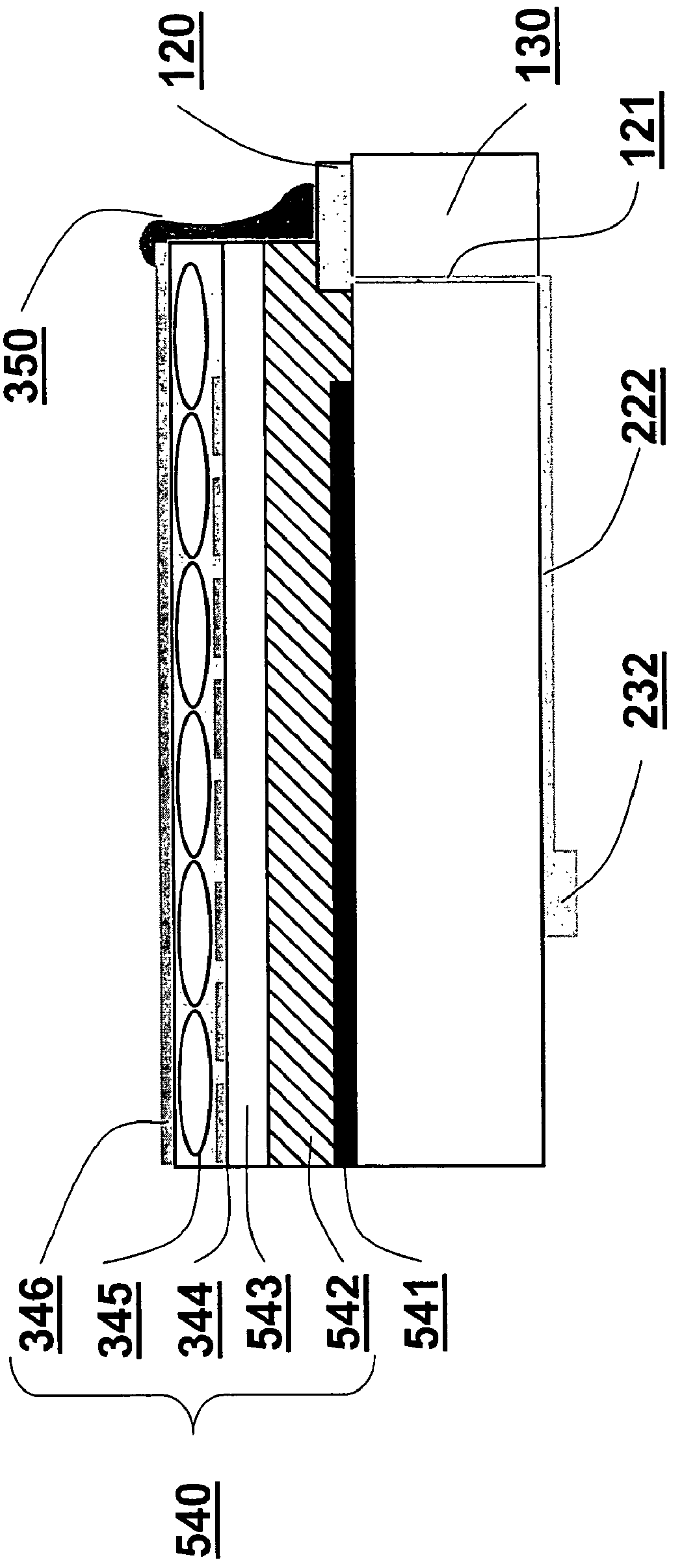
FIG. 5 is an illustration of the side view of the cholesteric reflective display with the display elements laminated on the circuit board substrate.

FIG. 5 shows liquid crystal display device 500, which is similar to the device shown in FIG. 3. In this disclosure like parts share the same reference numerals throughout the several views. One difference is that display components 540 are first coated on a release liner (not shown), as disclosed in patent application No.: PCT/US2005/003144, entitled "Liquid Crystal Display Films," filed Jan. 28, 2005, which is incorporated herein by reference in its entirety. Then the display components 540 are released from the liner and transferred onto the optional opaque preparation layer 541 on the PCB substrate 130. Display components 540 are coated onto the release liner in bottom-up sequence with pressure sensitive adhesive 542 on the bottom followed by a substrate 543, conducting column electrodes 344, then the cholesteric dispersion layer 345, followed by the row conductive elements 346. Substrate 543 is opaque and preferably black, which would eliminate the need for the opaque layer 541. Following lamination a connecting conductor liquid 350 is added to electrically connect the conducting layers (e.g., row electrode 346 as illustrated) to the conducting tabs (e.g., row tab 120 as illustrated). The printed circuit board 130 contains the appropriate electronic drive circuitry indicated by the drive circuit 232 connected to the pad 120 by the conductor 222 and a via or pin 121.

Figure 6:
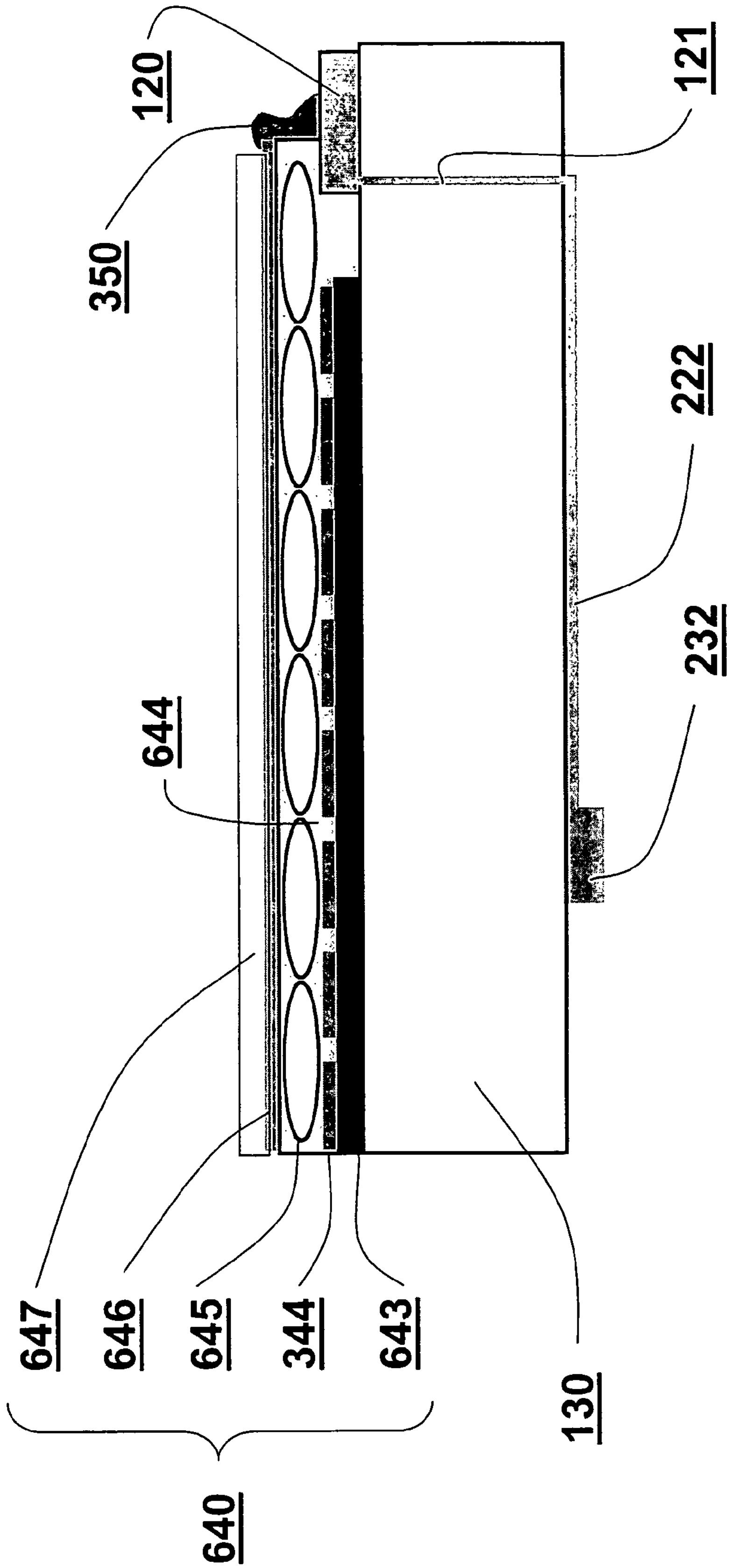
FIG. 6 is an illustration of another embodiment of the exemplary passive matrix display wherein the cholesteric dispersion is prepared by phase separation techniques and laminated between a circuit board substrate and an upper transparent substrate.

Turning to FIG. 6, another embodiment of the present invention features passive matrix display 600 wherein the cholesteric dispersion is prepared between the PCB substrate 130 and an upper transparent substrate by phase separation methods. Optional opaque preparation layer 643 is printed, coated or laminated onto the circuit board 130. The preparation layer 643 is preferably black in color and serves to planarize and chemically prepare the surface to accept the column electrodes 344. The column electrodes may be conducting polymer, indium tin oxide or other conducting material that is either transparent or opaque. Layer 643 and the electrodes 344 may be coated or printed on substrate 130 or the electrodes 344 may be coated and etched on the layer 643 prior to lamination of the combination onto circuit board 130. A liquid mixture 644 of cholesteric liquid crystal and prepolymer with spacers (not shown) may then be printed or coated onto the surface of the electrodes 344. An upper substrate 647 containing transparent conducting electrodes 646 is then laminated over the liquid crystal mixture sandwiching the mixture between the column electrodes 344 and row electrodes 646. The liquid crystal mixture is then irradiated with ultra violet light, forming the droplet dispersion 645, as described in the publication: "Polymer Dispersed Liquid Crystal Displays," in *Liquid Crystals: Applications & Uses*, Ed. Birendra Bahadur (World Scientific Pub. 1990), Chapter 14, which is incorporated herein by reference. The liquid conducting material 350 is then applied making electrical connections between row and column electrodes and pads 120 and 110. Conducting via or pin 121 and conductor 222 connect the display electrodes to the driver 232.

Turning to FIG. 7, a multi-color cholesteric reflective display 700 includes various cholesteric liquid crystal dispersion layers: 740 (red reflective); 750 (green reflective); and 760 (blue reflective), each with the exemplary passive matrix design, which are printed, coated or laminated onto a printed circuit board 730. Transparent substrates or isolation layers 751 and 761 are located between the dispersion layer 740 and dispersion layer 750, and between the dispersion layer 750 and the dispersion layer 760, respectively. Transparent protective layer 771 is printed, coated or laminated on the top of the elements of the multicolor display. An optional opaque protective layer 741 is placed on the surface of the circuit board substrate 730. The column and row electrodes are connected to conductive pads as discussed above. However, only the row electrodes 746, 756 and 766 are shown connected to tabs 720, 725 and 726, respectively, in FIG. 7. The pads are connected to the drivers as illustrated wherein pad 720 connects one row of the red display 740 to the via or pin 721, which is connected to the driver 732 by back conductor 772.

FIG. 8 is an illustration of the top surface of a multiple-color cholesteric reflective display 780, containing the red, green, and blue stacked reflective dispersion layers. The connecting pads 720, 725 and 726 connect to the row electrodes for the red, green, and blue layers respectively.

As another option a plurality of multi-color groups can be formed in the dispersion layer at each pixel of the liquid crystal display. Each multi-color group includes red, green and blue reflective cholesteric liquid crystal material.

The passive matrix type display illustrated in FIGS. 1-8 is but one example of the type of a reflective cholesteric display that can use a printed circuit board as the substrate in accordance with the present invention. Another example is an active matrix cholesteric display. In such a display the circuit board is most likely a glass substrate or a silicon wafer both of which have transistor switching circuits and lower conducting electrodes at each pixel site offering control of the voltages at the pixel sites as is well known in the LCD flat-panel display art found for example in the publication by F. C. Luo, Chapter 15 in *Liquid Crystals Applications and Uses* (ed. B. Bahadur), World Scientific, Singapore, which is incorporated herein by reference. A matrix of transistors may be included on the front surface of the PCB substrate. The first electrode layer is printed or coated onto the transistors. In this type of substrate the cholesteric dispersion material is coated or printed directly on top of this circuitry. A preparation layer may be coated prior to coating the cholesteric dispersion to planarize the surface or make the surface chemically suitable for the dispersion. Following the coating of the cholesteric dispersion, a transparent conductor is printed or coated over the dispersion to serve as the upper electrode. The back side of the printed circuit board may contain the drive circuitry in the same manner as the passive matrix substrate as illustrated in FIG. 2. Conducting pins or vias through the circuit board may be employed to connect the drive circuitry on the back side of the PCB to the active matrix circuitry on the front side of the PCB. Cholesteric dispersions may be in the form of the same emulsion type or phase separated type that are used in the inventive passive matrix display.

Another type of display other than the exemplary passive matrix and exemplary active matrix cholesteric displays described above is a direct driven type display that utilizes a printed circuit board as the display substrate. In such a display patterned conducting elements usually patterned in the form of alpha numeric segments or seven segments as is well known in the art (see for example U.S. Pat. No. 5,636,044) are directly connected to the drive circuitry on the back side of the board by conducting pins or vias. The present invention will now be described by reference to the following examples, which are not intended to limit the invention in any way.

EXAMPLE 1

An operable 13×16 pixel passive matrix cholesteric display was made by coating and printing the various display elements on a plastic substrate with back pressure sensitive adhesive (PSA) layer and release liner. The plastic substrate was a PET sheet with a thickness of 12.5 microns available from Grafix (Cleveland). A layer of conducting polymer (ELP-3040 available from Agfa-Gevaert, Belgium) was screen printed on the plastic substrate as 5 mm wide, 15 cm long electrode strips spaced 1 mm apart to serve as the column electrodes of the passive matrix display. After casting, the conducting polymer was cured at 100° C. for 10 minutes. A layer of encapsulated cholesteric liquid crystal in polymer binder was coated from a water-based emulsion on the conducting polymer layer using a doctor blade having a 25 micron (μm) gap and allowed to dry for 1 hour at room temperature. The thickness of the encapsulated liquid crystal layer was approximately 8-10 μm. The emulsion was prepared from 0.4 g of green ChLC KLC19 (EM Industries of Hawthorne, N.Y.) and 0.27 g of NeoRez R967 and was emulsified with a homogenizer (PowrerGen 700) at 1000 rpm for 3-4 minutes at room temperature. The content of liquid crystal and binder in the encapsulated layer was 78% and 22%, respectively. The emulsified CLC formed droplets which were about 3-15 μm in diameter. A second conductive layer was formed using a highly transparent conductive polymer Dipcoat available from Agfa. A thin layer of conductive polymer was deposited using air brushing over a mask and cured at room temperature. The mask was patterned to provide 5 mm wide, 15 cm long electrode strips spaced 1 mm apart to form the row electrodes of the passive matrix display. For protection of the display, a clear coat was deposited on the top of the second conductive electrode using a doctor blade. Clear coat material was polyurethane latex NeoRez R967 cross-linked with 1% of NeoCryl CX-100. The total thickness of the coatings on a 12.5 μm PET substrate was on the order of 20 μm.

The transfer display film including all of the layers from the 12.5 μm PET substrate with PSA to the clear coat was lifted off the release liner. These display components were then laminated together onto a PCB as illustrated in FIG. 1. The PCB was a typical PCB having a rigid fiberglass board and designed so that the electrodes for the rows and columns were connected to it and vias pass from them to the back where additional circuitry is located. On the back of the PCB in this example the vias were connected to a flat cable connector used to communicate control and driving data between the integrated PCB display and the drive electronics to implement a working display. Conducting polymers were used to electrically interconnect the display electrodes and PCB pads.

EXAMPLE 2

The following is an example of preparation of the coated cholesteric display directly on the PCB. The display had the same sequence of layers as in Example 1 except that the 12.5 μm PET with PSA and release liner were replaced by the PCB. All display layers including bottom conducting polymer electrodes, encapsulated liquid crystal, top conducting polymer electrodes and clear coat were sequentially coated directly on the PCB as a substrate.

The top conducting polymer electrodes were connected to the PCB pads as in Example 1. The bottom conducting polymer electrodes were connected to the driving electronics through vias in the PCB.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A liquid crystal display device, comprising:

a printed circuit board, PCB, substrate composed of non-conductive material and having a non-component surface that is free of electrical components for driving a liquid crystal display and having an opposing back surface that contains electrical circuitry and is located near the back of the display device;

said liquid crystal display disposed on said non-component surface and comprising first and second electrode layers and a dispersion layer disposed between said first and second electrode layers, said dispersion layer comprising liquid crystal dispersed in a polymer matrix;

electrical through-conductors extending between said non-component surface and said back substrate surface, said through-conductors being in electrical contact with said first and second electrode layers; and drive electronics disposed on said back substrate surface in electrical contact with said through-conductors, said drive electronics being adapted to apply voltage pulses to said first and second electrode layers effective to form images on said liquid crystal display;

wherein said display device lacks supports for components of said display other than said PCB substrate.

2. The display device of claim 1 comprising front electrical conductors electrically connecting said first and second electrode layers to said through-conductors near said non-component surface, and back electrical conductors electrically connecting said drive electronics to said through-conductors near said back substrate surface.

3. The display device of claim 1 wherein said liquid crystal display is a reflective display and said liquid crystal comprises cholesteric liquid crystal.

4. The display device of claim 3 wherein said reflective display includes focal conic and planar textures that are stable in an absence of an electric field.

5. The display device of claim 1 wherein said first electrode layer includes a plurality of spaced apart parallel conductive strips arranged as row electrodes and said second electrode layer includes a plurality of spaced apart parallel conductive strips arranged as column electrodes, said row electrodes extending orthogonal to said column electrodes.

6. The display device of claim 1 wherein said first and second electrode layers are composed of one of conductive polymer and carbon nanotubes.

7. The display device of claim 1 wherein said liquid crystal display comprises a protective transparent layer disposed over one of said first and second electrode layers that is located more distal from said PCB substrate than the other of said first and second electrode layers.

8. The display device of claim 1 wherein said liquid crystal display comprises at least one additional dispersion layer arranged over said dispersion layer and electrode layers disposed on either side of said additional dispersion layer.

9. The display device of claim 8 wherein said liquid crystal display comprises an electrical insulation layer disposed between adjacent said dispersion layers.

10. The display device of claim 8 wherein said liquid crystal display comprises: a first dispersion layer including red reflective cholesteric liquid crystal material, a second dispersion layer including green reflective cholesteric liquid crystal material and a third dispersion layer including blue reflective cholesteric liquid crystal material.

11. The display device of claim 1 wherein said through-conductors comprise one of vias and pins.

12. The display device of claim 1 comprising an adhesive layer located between said liquid crystal display and said PCB substrate.

13. The display device of claim 1 comprising a layer located between said dispersion layer and said PCB substrate that is one of black or color reflective.

14. The display device of claim 1 comprising a planarization layer located between said dispersion layer and said PCB substrate.

15. A method of fabricating a liquid crystal display device comprising the steps of:

providing a printed circuit board, PCB, substrate composed of non-conductive material and having a non-component surface that is free of electrical components for driving a liquid crystal display and having an opposing back surface that contains electrical circuitry and is located near the back of the display device, said PCB substrate comprising: electrical through-conductors between said non-component surface and said back substrate surface and drive electronics in electrical contact with said through-conductors near said back substrate surface, said drive electronics being adapted to apply voltage pulses to form images on said liquid crystal display; and applying said liquid crystal display onto said non-component surface, said liquid crystal display comprising first and second electrode layers and a dispersion layer disposed between said first and second electrode layers, said dispersion layer comprising liquid crystal dispersed in a polymer matrix, wherein application of said first electrode layer near said non-component surface forms an electrical connection to said through-conductors, wherein said display device lacks supports for components of said display other than said PCB substrate.

16. The method of claim 15 comprising forming front electrical conductors near said non-component surface in electrical contact with said through-conductors, and back electrical conductors electrically connecting said drive electronics to said through-conductors near said back substrate surface, wherein said application of said first electrode layer forms an electrical connection with said front electrical conductors.

17. The method of claim 15 comprising forming said liquid crystal display by printing or coating component layers of said display on a transfer film, said component layers including said first electrode layer, said dispersion layer and said second electrode layer, curing said component layers and then transferring said component layers onto said non-component surface.

18. The method of claim 15 comprising the step of tiling multiple additional said liquid crystal display devices together at edges thereof, wherein each of said liquid crystal display devices extends substantially to outer edges of the respective PCB substrate to form a large format display matrix.

19. The method of claim 15 wherein said drive electronics comprise row drive electronics and column drive electronics, comprising front conductors including a plurality of spaced apart first conductive pads in communication with said row drive electronics and a plurality of spaced apart second conductive pads in communication with said column drive electronics, comprising forming one of said first and second electrode layers to include a plurality of spaced apart parallel conductive strips arranged as row electrodes and forming the other of said first and second electrode layers to include a plurality of spaced apart parallel conductive strips arranged as column electrodes, said row electrodes extending orthogonal to said column electrodes, further comprising applying electrically conductive liquid between said row electrodes and said first pads and between said column electrodes and said second pads.

20. The method of claim 19 wherein said electrically conductive liquid comprises a conductive polymer.

21. The method of claim 15 comprising forming additional dispersion layers over said dispersion layer and electrode layers on either side of each of said additional dispersion layers.

22. The method of claim 21 comprising forming as said dispersion layers: a first dispersion layer including red reflective cholesteric said liquid crystal material, a second dispersion layer including green reflective cholesteric said liquid crystal material and a third dispersion layer including blue reflective cholesteric said liquid crystal material.

23. The method of claim 15 comprising forming a plurality of multi-color groups of said liquid crystal in said dispersion layer at each pixel of said liquid crystal display, each said multi-color group including red reflective cholesteric said liquid crystal material, green reflective cholesteric said liquid crystal material and blue reflective cholesteric said liquid crystal material.

24. The method of claim 15 comprising applying a matrix of transistors on said front surface, wherein said first electrode layer is coated or printed onto said transistors.

25. A method of fabricating a liquid crystal display device comprising the steps of:

providing a printed circuit board, PCB, substrate composed of non-conductive material and having a non-component surface that is free of electrical components for driving a liquid crystal display and having an opposing back surface that contains electrical circuitry and is located near the back of the display device;

forming electrical through-conductors between said non-component surface and said back substrate surface;

forming front electrical conductors on said non-component surface in electrical contact with said through-conductors;

forming back electrical conductors electrically connected to said through-conductors on said back substrate surface;

connecting drive electronics in electrical contact with said back electrical conductors, said drive electronics being adapted to apply voltage pulses to form images on said liquid crystal display; and applying said liquid crystal display onto said non-component surface, said liquid crystal display comprising first and second electrode layers and a dispersion layer disposed between said first and second electrode layers, said dispersion layer comprising cholesteric liquid crystal dispersed in a polymer matrix, wherein application of said first electrode layer forms an electrical connection with said front conductors, wherein said display device lacks supports for components of said display other than said PCB substrate.

26. The method of claim 25 wherein said drive electronics comprise row drive electronics and column drive electronics, comprising front conductors including a plurality of spaced apart first conductive pads in communication with said row drive electronics and a plurality of spaced apart second conductive pads in communication with said column drive electronics, comprising forming one of said first and second electrode layers to include a plurality of spaced apart parallel conductive strips arranged as row electrodes and forming the other of said first and second electrode layers to include a plurality of spaced apart parallel conductive strips arranged as column electrodes, said row electrodes extending orthogonal to said column electrodes, further comprising applying electrically conductive liquid between said row electrodes and said first pads and between said column electrodes and said second pads.

* * * * *